United States Patent
Mathews et al.

(10) Patent No.: US 8,938,770 B2
(45) Date of Patent: Jan. 20, 2015

(54) BANDWIDTH AND SERVER RESOURCE SAVINGS THROUGH USE OF LEGACY CLIENT CAPABILITY IN A REMOTE USER INTERFACE SYSTEM

(75) Inventors: Robin Montague Mathews, Westford, MA (US); Tushar Saxena, Lexington, MA (US); Samuel O. Akiwumi-Assani, Beacon, NY (US)

(73) Assignee: Verizon Patent and Licensing Inc., Basking Ridge, NJ (US)

( * ) Notice: Subject to any disclaimer, the term of this patent is extended or adjusted under 35 U.S.C. 154(b) by 246 days.

(21) Appl. No.: 12/832,473

(22) Filed: Jul. 8, 2010

(65) Prior Publication Data

US 2012/0011557 A1 Jan. 12, 2012

(51) Int. Cl.
| | |
|---|---|
| *H04N 7/173* | (2011.01) |
| *H04N 21/61* | (2011.01) |
| *H04N 21/258* | (2011.01) |
| *H04N 21/462* | (2011.01) |
| *H04N 21/637* | (2011.01) |
| *H04N 21/643* | (2011.01) |
| *H04N 21/6547* | (2011.01) |

(52) U.S. Cl.
CPC ..... *H04N 21/6106* (2013.01); *H04N 21/25833* (2013.01); *H04N 21/4622* (2013.01); *H04N 21/637* (2013.01); *H04N 21/64322* (2013.01); *H04N 21/6547* (2013.01)
USPC .............................. 725/131; 725/81; 725/87

(58) Field of Classification Search
USPC .............................................. 725/131, 81, 87
See application file for complete search history.

(56) References Cited

U.S. PATENT DOCUMENTS

| | | | | |
|---|---|---|---|---|
| 2007/0081537 | A1* | 4/2007 | Wheelock | 370/392 |
| 2009/0193469 | A1* | 7/2009 | Igarashi | 725/56 |
| 2010/0287480 | A1* | 11/2010 | Hicks et al. | 715/751 |
| 2011/0072474 | A1* | 3/2011 | Springer et al. | 725/95 |
| 2011/0138064 | A1* | 6/2011 | Rieger et al. | 709/228 |
| 2011/0296030 | A1* | 12/2011 | Gaxiola | 709/227 |

* cited by examiner

*Primary Examiner* — Jivka Rabovianski (57) ABSTRACT

A server receives a request for delivery of media from a client, and determines if the client has a capability to tune to a quadrature amplitude modulated (QAM) channel carried by a first network. The server sends a message to the client to instruct the client to tune to the QAM channel to receive the media via the first network if it is determined that the client has the capability to tune to the QAM channel. The server sends the media to the client if it is determined that the client does not have the capability to tune to the QAM channel.

19 Claims, 13 Drawing Sheets

BANDWIDTH AND SERVER RESOURCE SAVINGS THROUGH USE OF LEGACY CLIENT CAPABILITY IN A REMOTE USER INTERFACE SYSTEM

BACKGROUND

Typically, home entertainment subscribers, such as, for example, subscribers to cable network home entertainment, connect multiple televisions to cable network connections throughout the home. A typical home entertainment system may include a single, primary television connected to a set-top box (STB) to receive high definition programming via the cable network, while other televisions in the home connect directly to the cable network and may only receive a limited number of high definition channels. Each of the televisions cannot necessarily access media being presented at the other televisions. For example, a television connected directly to the cable network cannot access high definition media that is available to the television connected to the STB. Additionally, the televisions connected directly to the cable network may not receive other types of media that may be accessed at the television connected to the STB. For example, if the STB includes a digital video recorder (DVR), the recorded television programming stored on the DVR is only accessible via the television connected to the STB, and not to the other televisions connected directly to the cable network.

The RVU (pronounced "R-view") protocol specification, which implements a remote user interface system, has been introduced in the home entertainment industry to enable television viewers to watch live or recorded television programming, or other types of media, on any television within the home, while at the same time experiencing a consistent user interface. With the RVU protocol specification, RVU-compliant televisions (i.e., RVU clients) are networked in the home with an RVU server. Once networked, viewers can watch the same or different content from any television in the home. For example, a viewer can access high-definition programming from any high definition capable televisions in the home, and can record and play back high-definition programming from any of the high definition capable televisions. Additionally, the viewer can access personal media content, and interact with interactive applications from any of the televisions. The RVU protocol's system is based on a client-server architecture where the server distributes and manages content and a consistent user interface to one or many client devices, such as televisions. The RVU clients can connect to programming that can be recorded or watched live, and can also access pictures, home movies, and/or other personal content from connected storage devices, subject to the server making that media available. All of the content may be accessed from anywhere inside the home allowing multiple viewers in different rooms to view the same or different content from the RVU server simultaneously.

DETAILED DESCRIPTION OF THE PREFERRED EMBODIMENTS

The following detailed description refers to the accompanying drawings. The same reference numbers in different drawings may identify the same or similar elements. The following detailed description does not limit the invention.

Exemplary embodiments described herein leverage QAM tuning capabilities of legacy client devices (i.e., client devices connected to a remote user interface system that have existing QAM tuning capabilities) that are used in a remote user interface system to reduce the demand on bandwidth and resources of the server that serves the client devices. When a client device in the remote user interface system requests the delivery of media, the server may determine whether the requesting client device has QAM tuning capability and, if so, the server may instruct the client device to use its existing legacy QAM tuning capabilities to tune to a QAM channel to receive delivery of the media from a content service provider. If the server determines that the client device does not have QAM tuning capability, then the server may itself tune to a QAM channel to receive delivery of the media from the content service provider, and may then process and deliver the media to the client device using Internet Protocol (IP). Use of legacy QAM tuning capabilities of client devices reduces home network bandwidth usage, and saves resource usage in the server device. The remote user interface system described herein may include any type of remote user interface system. In one exemplary implementation, the remote user interface system may include a system employing the RVU protocol. In such an implementation, one or more of the clients may include RVU clients, and the server may include an RVU server.

Figure 1:
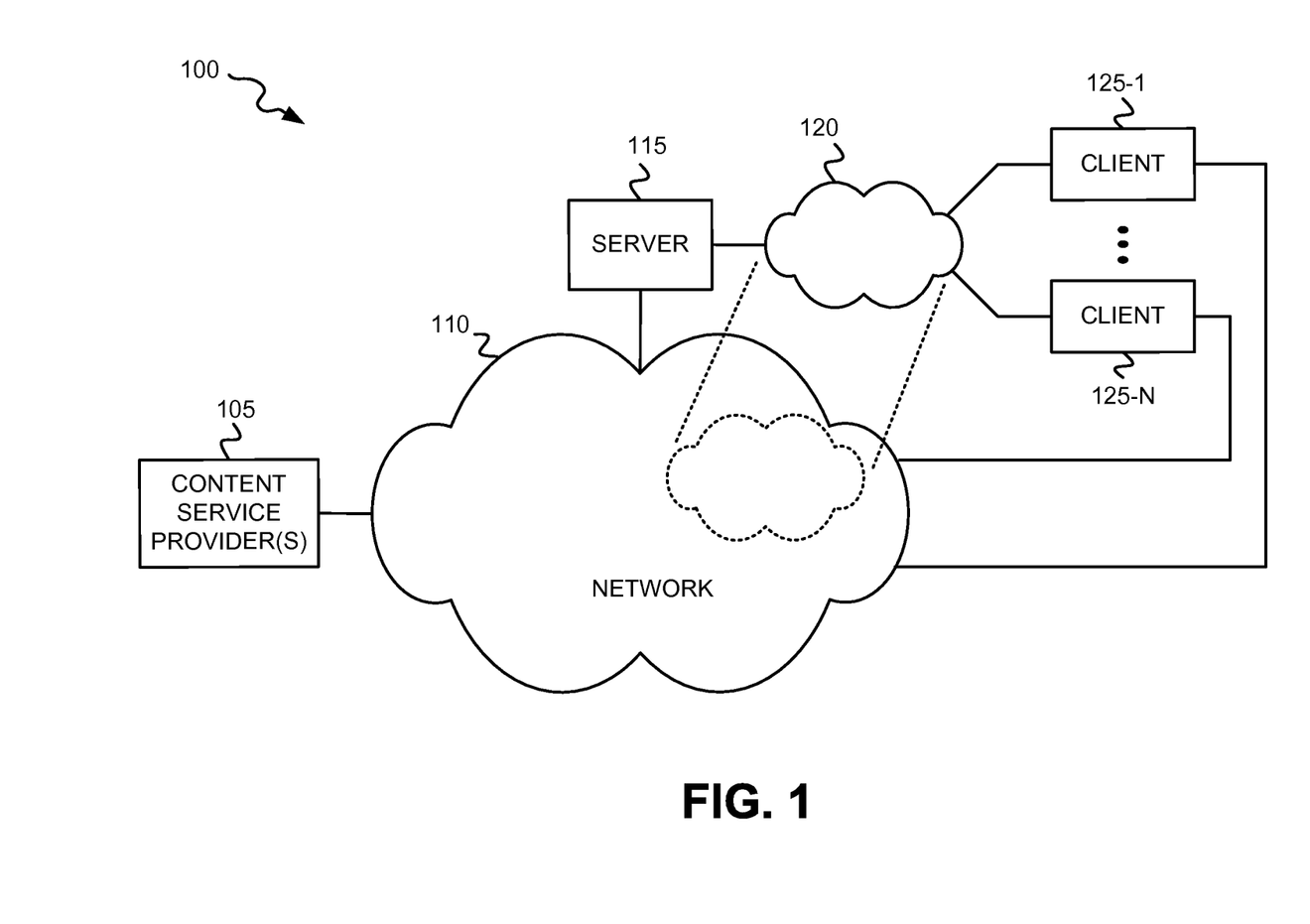
FIG. 1 is a diagram that depicts an exemplary network in which content may be delivered to end user client devices via the network.

FIG. 1 is a diagram that depicts an exemplary network 100 in which content (e.g., media) may be delivered to end user client devices via the network. Network 100 may include a content service provider(s) 105, a network 110, a server 115, a network 120, and clients 125-1 through 125-N (generically and individually referred to herein as a "client 125").

Content service provider(s) 105 may include one or more devices, or a network of devices, that deliver content to clients 125-1 through 125-N. Content service provider(s) 105 may deliver the content to clients 125-1 through 125-N via one or more QAM channels over network 110 either directly, or indirectly via server 115.

Network 110 may include one or more networks of any type, such as, for example, a cable network, a satellite network, a telecommunications network (e.g., a Public Switched Telephone Network (PSTN) or Public Land Mobile Network (PLMN)), or an Advanced Television Systems Committee (ATSC) standards network. Network 110 may include one or more QAM channels for delivering media to server 115 and/or certain ones of clients 125-1 through 125-N.

Server 115 may include a remote user interface server entity that may tune to a QAM channel on network 110 to receive media delivered from content service provider(s) 105, and then forward the received media to a respective client 125 via IP. In one exemplary embodiment, server 115 may include an RVU server entity. In circumstances where the client 125 requesting the media has legacy QAM tuning capability, then server 115 may instruct the client 125 to tune to the QAM channel and receive media delivery directly, without having server 115 act as the intermediate delivery node.

Network 120 may, in one implementation, include a separate network from network 110, where the separate network may include, for example, a local area network, wide area network, Internet, or other type of network employing IP. In another implementation, network 120 may actually be the same network as network 110. If network 120 is the same network as network 110, then server 115 may use a different channel (e.g., a different QAM channel) to deliver media to clients 125-1 through 125-N than the QAM channel used to deliver media from content service provider(s) 105 to server 115.

Clients 125-1 through 125-N may include remote user interface client entities that may include mechanisms for receiving media forwarded from server 115 via IP. In one exemplary embodiment, clients 125-1 through 125-N may include RVU client entities. In some instances, one or more of clients 125-1 through 125-N may additionally include QAM tuning mechanisms for tuning to a QAM channel carried by network 110. For those ones of clients 125-1 through 125-N that include QAM tuning mechanisms for tuning to a QAM channel on network 110, server 115 may instruct those clients to tune to the QAM channel to receive media delivered from content service provider(s) 105. For other clients 125-1 through 125-N that do not include QAM tuning mechanisms, server 115 may tune to the QAM channel to receive the media delivered from content service provider(s) 105 and may forward the media to the clients using IP over network 120.

Figure 2A:
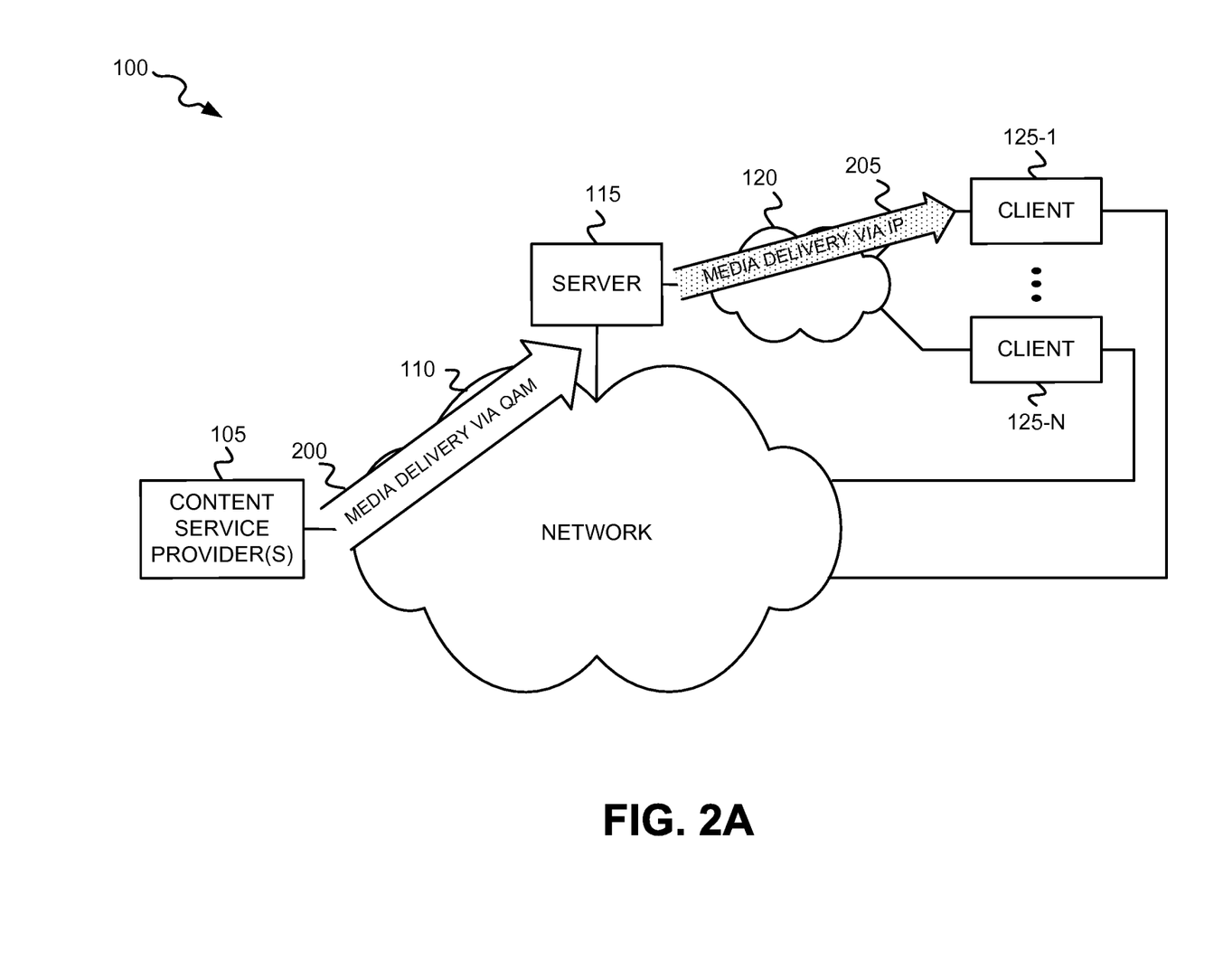
FIG. 2A depicts an exemplary implementation in which content is delivered to a client via a server using Internet Protocol (IP)

FIG. 2A depicts an exemplary implementation in which content (e.g., media) is delivered to client 125-1 via server 115 using IP. In the exemplary implementation of FIG. 2A, client 125-1 includes a remote user interface client entity that does not include mechanisms for tuning to a QAM channel on network 110, but does include mechanisms for receiving media forwarded from server 115 via IP. As shown in FIG. 2A, server 115 may tune to a QAM channel on network 110 to receive the media delivery 200 via the QAM channel. Upon receipt of the delivered media, server 115 may process the media for delivery 205 to client 125-1 via IP over network 120.

Figure 2B:
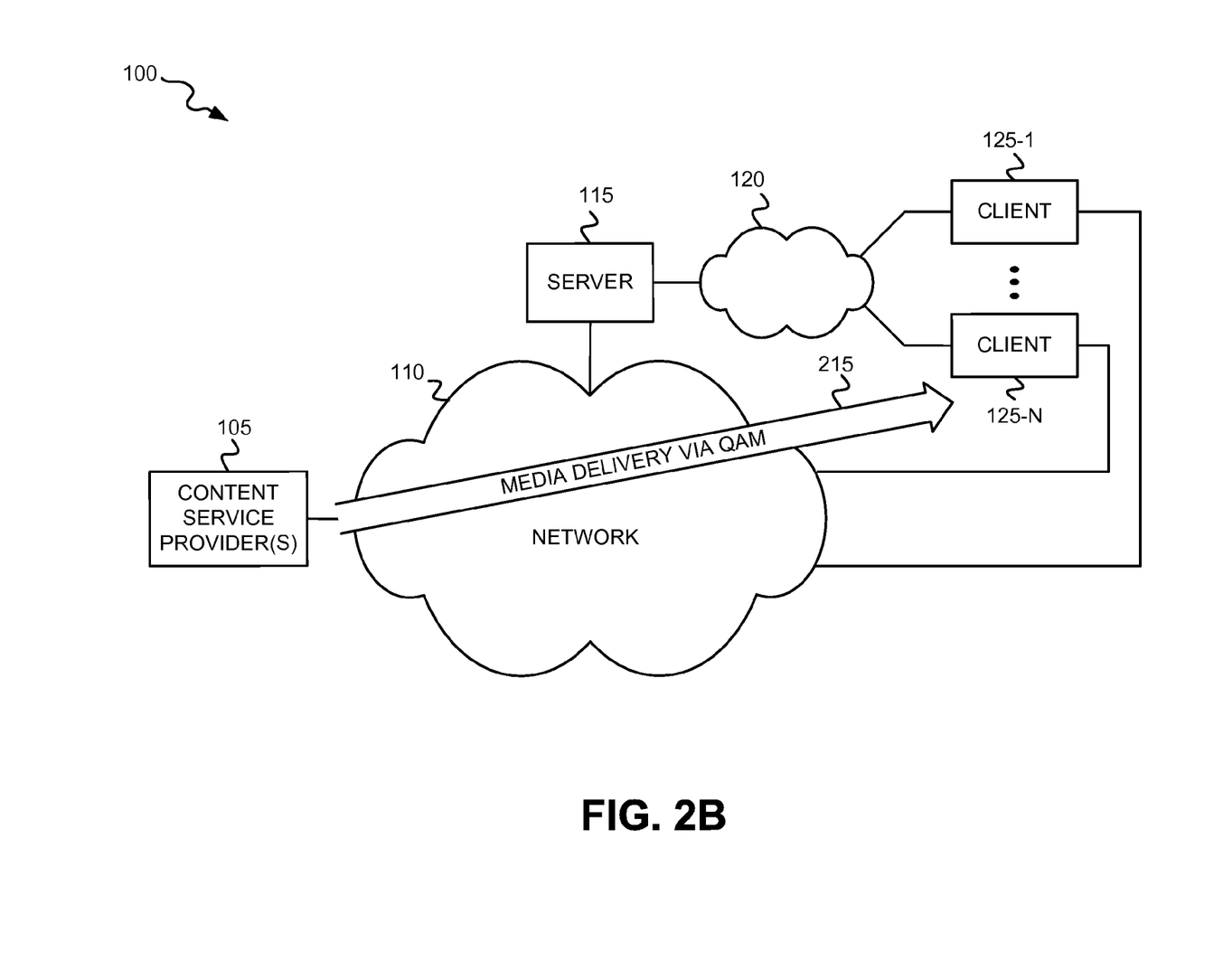
FIG. 2B depicts an exemplary implementation in which content is delivered to a client using a Quadrature Amplitude Modulated (QAM) channel over a network.

FIG. 2B depicts another exemplary implementation in which content (e.g., media) is delivered directly to client 125-N using a QAM channel over network 110. In the exemplary implementation of FIG. 2B, client 125-N includes a remote user interface client that further includes mechanisms for tuning to a QAM channel on network 110 in addition to mechanisms for receiving media forwarded from server 115 via IP. In the exemplary implementation of FIG. 2B, server 115 may instruct client 125-N to tune to a QAM channel on network 110 to receive media from content service provider(s) 105. Client 125-N may then tune to the QAM channel to receive a delivery 215 of media via the QAM channel.

Figure 3:
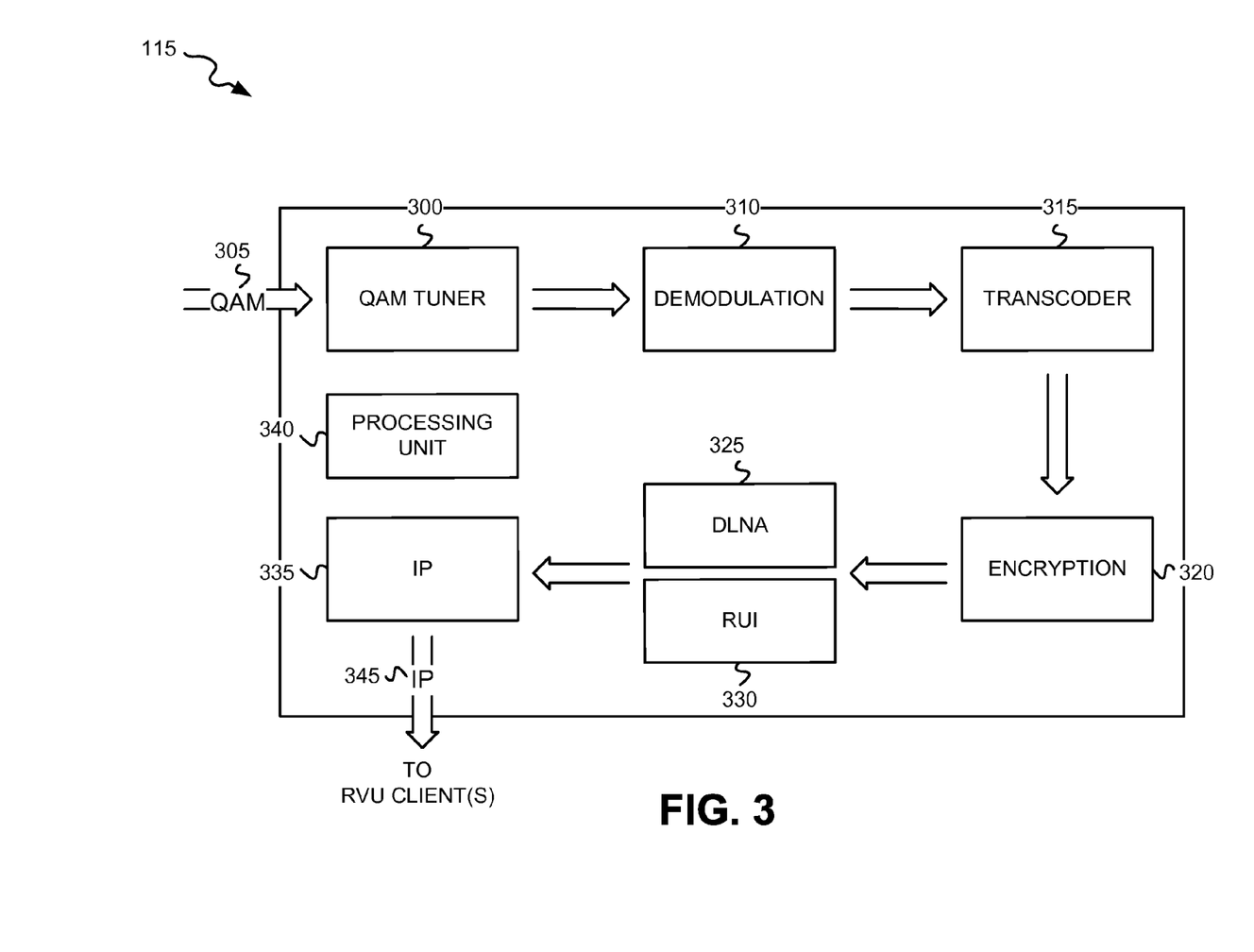
FIG. 3 is a diagram of exemplary components of the server of FIG. 1.

FIG. 3 is a diagram of exemplary components of server 115. Server 115 may include a QAM tuner subsystem 300, a demodulation subsystem 310, a transcoder subsystem 315, an encryption subsystem 320, a DLNA subsystem 325, a RUI subsystem 330, an IP subsystem 335, and a processing unit 340.

QAM tuner subsystem 300 may include mechanisms for tuning to one or more QAM channels on network 110 for receiving the delivery of media from content service provider(s) 105. Demodulation subsystem 310 may include mechanisms for demodulating signals received via the QAM channels on network 110. Transcoder subsystem 315 may include mechanisms for digital-to-digital conversion of data encoded for transmission over the QAM channels to data encoded for transmission via IP. Encryption subsystem 320 may include mechanisms for encrypting the data received from transcoder subsystem 315. DLNA subsystem 325 may include mechanisms for implementing the Digital Living Network Alliance (DLNA) standard for delivering content (e.g., media) from server 115 to clients 125-1 through 125-N. RUI subsystem 330 may include mechanisms for implementing a Remote User Interface (RUI) for facilitating the delivery of media to client 125. IP subsystem 335 may include mechanisms for delivery of media to clients 125-1 through 125-N using IP.

Processing unit 340 may include one or more processors, microprocessors, or processing logic that may interpret and execute instructions. Processing unit 340 may interface with each of the subsystems of server 115 described above.

Figure 4:
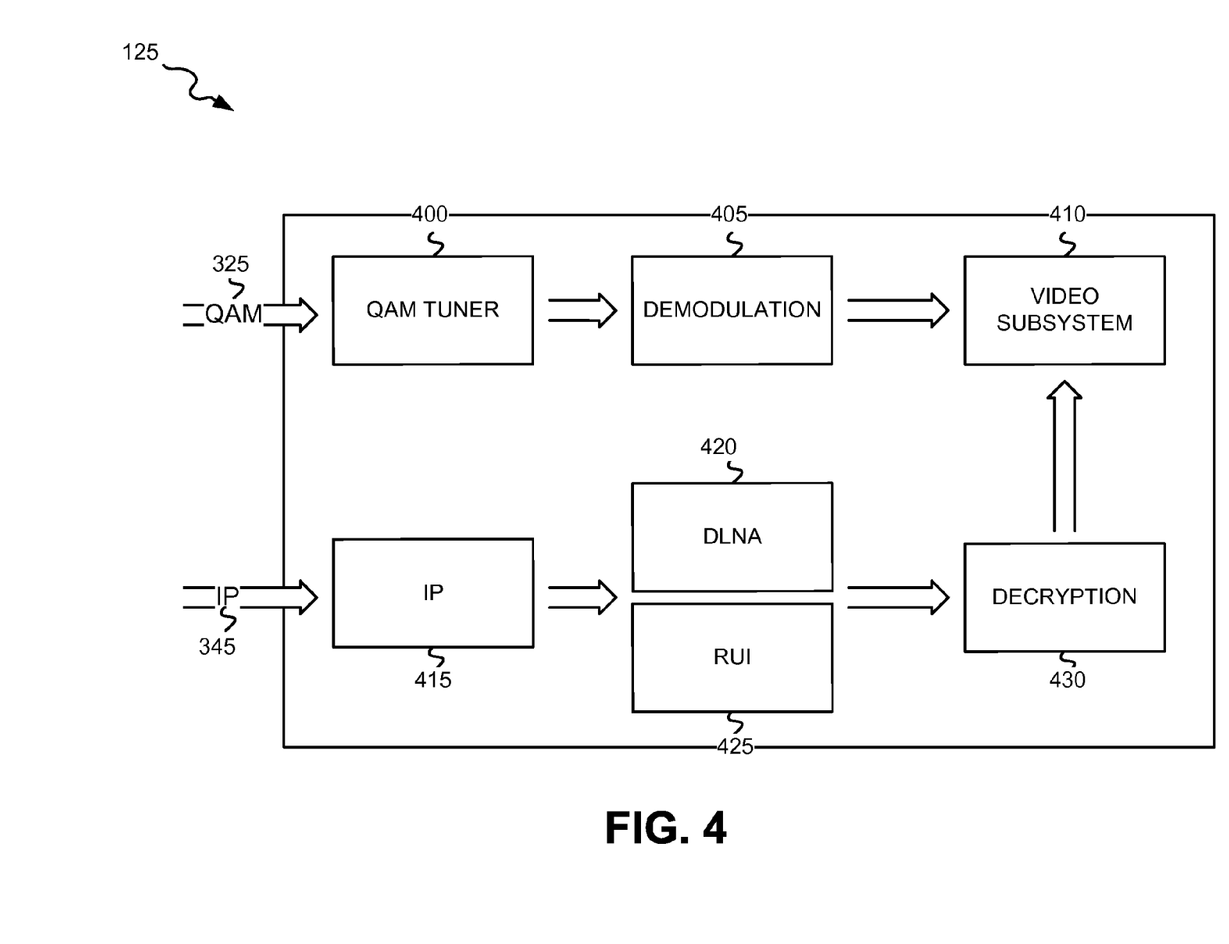
FIG. 4 is a diagram of exemplary components of a client of FIG. 1.

FIG. 4 is a diagram of exemplary components of a client 125, where client 125 includes mechanisms for receiving content via IP from server 115, and for receiving content by tuning to a QAM channel on network 110. Client 125 may include a QAM tuner subsystem 400, a demodulation subsystem 405, a video subsystem 410, an IP subsystem 415, a DLNA subsystem 420, a RUI subsystem 425, and a decryption subsystem 430.

QAM tuner subsystem 400 may include mechanisms for tuning to one or more QAM channels on network 110 for receiving the direct delivery of media from content service provider(s) 105, when instructed by server 115. Demodulation subsystem 405 may include mechanisms for demodulating signals received via the QAM channels on network 110. Video subsystem 410 may include mechanisms for generating signals required to display media on a video unit (e.g., a video monitor, or television screen).

IP subsystem 415 may include mechanisms for receiving data associated with delivered media via IP from server 115. DLNA subsystem 420 may include mechanisms for implementing the DLNA standard for receiving content (e.g., media) delivered from server 115. RUI subsystem 425 may include mechanisms for implementing a RUI for facilitating the delivery of media to client 125. Decryption subsystem 430 may include mechanisms for decrypting media data and for supplying the decrypted media data to video subsystem 410 for displaying to a user.

Figure 5:
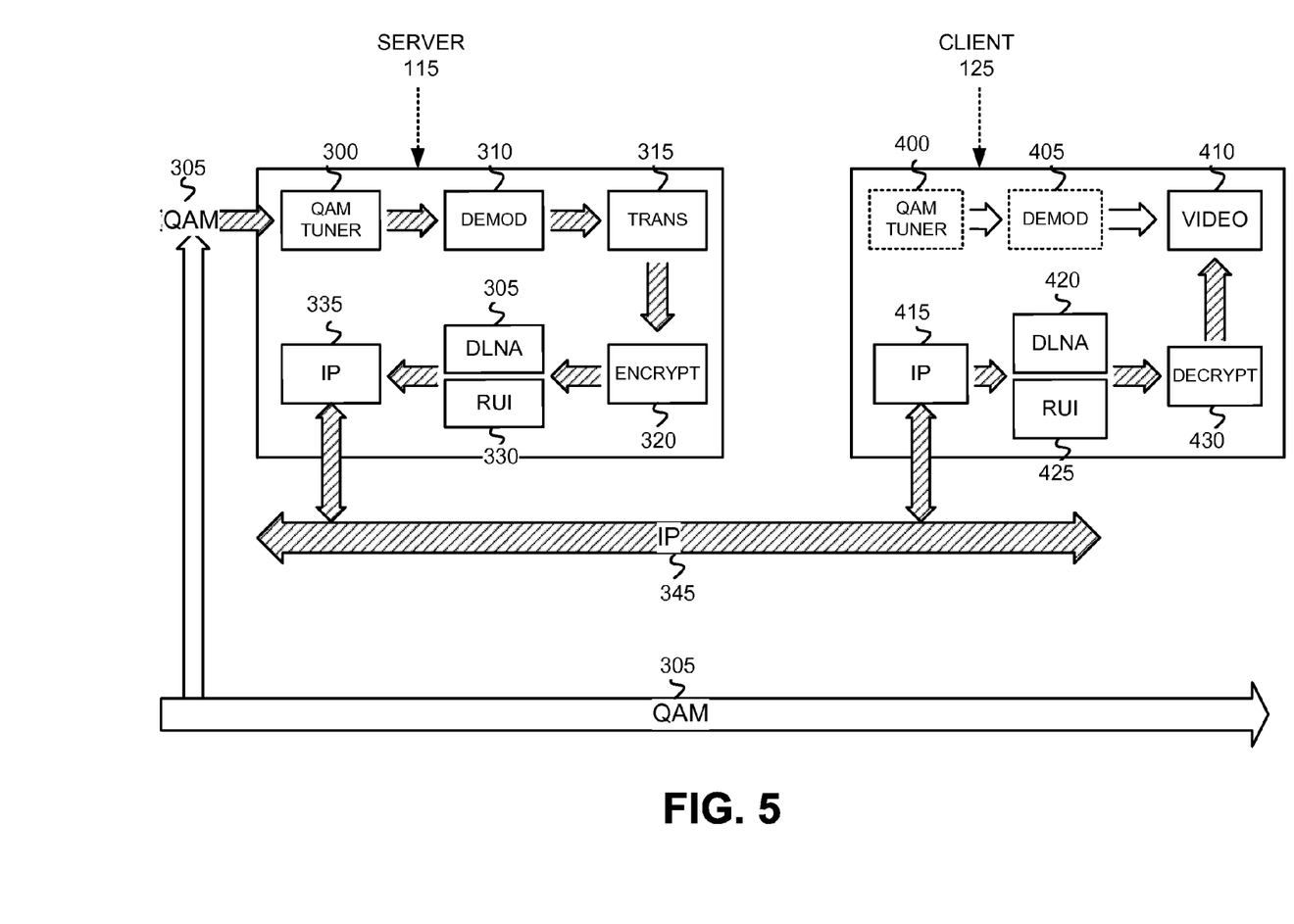
FIG. 5 is a diagram that depicts the delivery of content to a client of FIG. 1 in a circumstance where the server delivers the media to the client via IP.

FIG. 5 is a diagram that depicts the delivery of content to client 125 in the circumstance where server 115 delivers the media to client 125 via IP. The delivery of media as shown in FIG. 5 may occur in a situation in which client 125 may not include mechanisms for receiving media delivery via a QAM channel (i.e., does not include QAM tuner subsystem 400, demodulation subsystem 405, or where requested media is not available on the QAM channel to which QAM tuner subsystem 400 of client 125 may tune). As depicted in FIG. 5, QAM tuner subsystem 300 of server 115 may tune to QAM channel 305 to receive media delivery from content service provider(s) 105. The received media may be subsequently be processed by demodulation subsystem 310, transcoder subsystem 315, encryption subsystem 320, DLNA subsystem 325, RUI subsystem 330, and IP subsystem 335. IP subsystem 335 may format the media and send the media to client 125 via IP 345. Upon receipt of the media, client 125's IP subsystem 415 may send the media to DLNA subsystem 420, RUI subsystem 420, and decryption subsystem 430 for processing, and to video subsystem 410 for displaying to a user.

Figure 6:
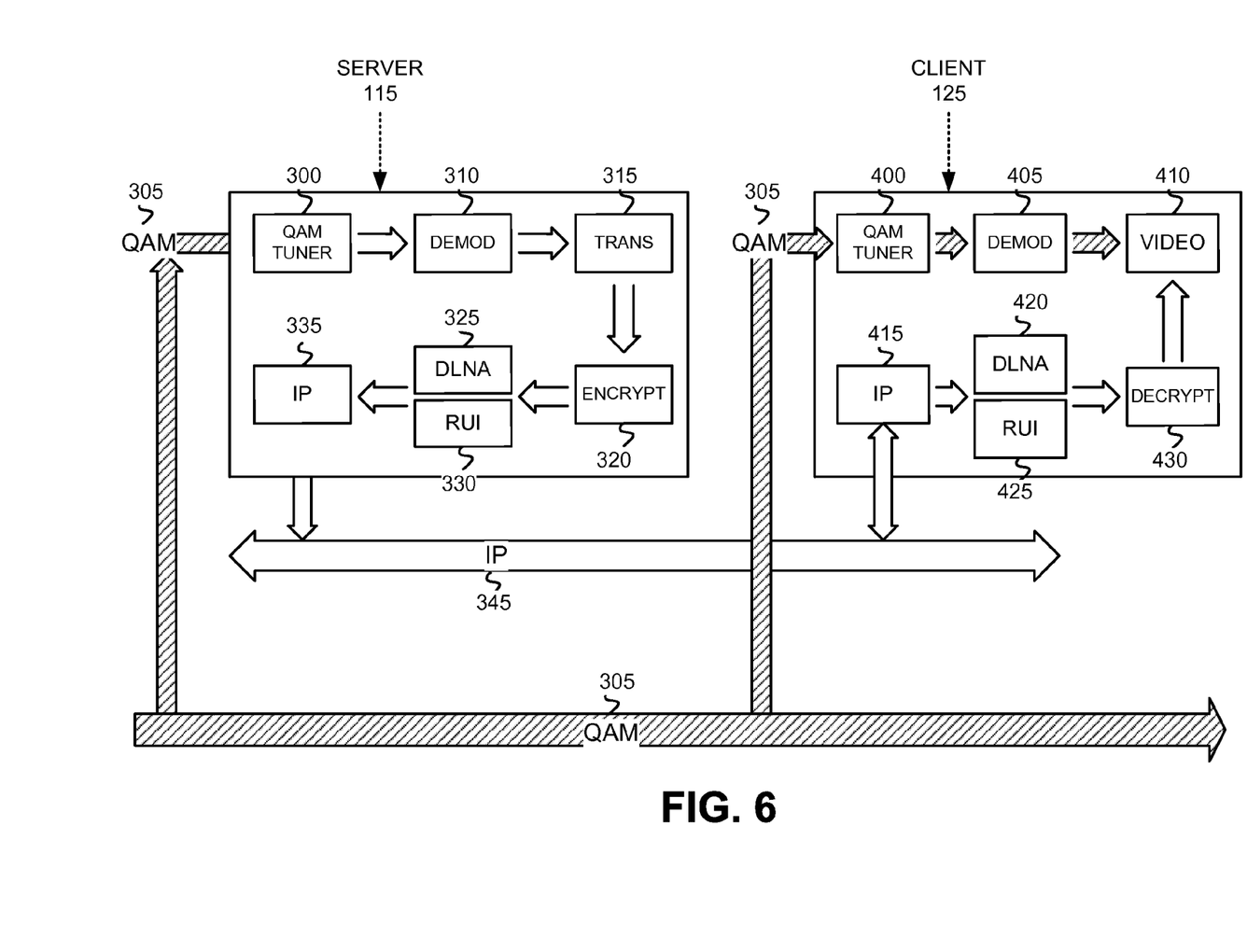
FIG. 6 is a diagram that depicts the delivery of content to a client of FIG. 1 in a circumstance where the client has legacy QAM tuning mechanisms and where requested media is available to a QAM channel to which the client may tune.

FIG. 6 is a diagram that depicts the delivery of content to a client 125 in a circumstance where client 125 does have legacy QAM tuning mechanisms (e.g., QAM tuner subsystem 400, demodulation subsystem 405), and where requested media is available to a QAM channel to which QAM tuner subsystem 400 of client 125 may tune. As depicted in FIG. 6, subsequent to receiving an instruction (not shown) from server 115 to tune to a QAM channel, QAM tuner subsystem 400 of client 125 may tune to QAM channel 305 to receive the media delivered from content service provider(s) 105. Upon receipt of the delivered media via QAM channel 305, demodulation subsystem 405 may process the media, and video subsystem 410 may present the media to a user (e.g., via a television monitor).

Figure 7A:
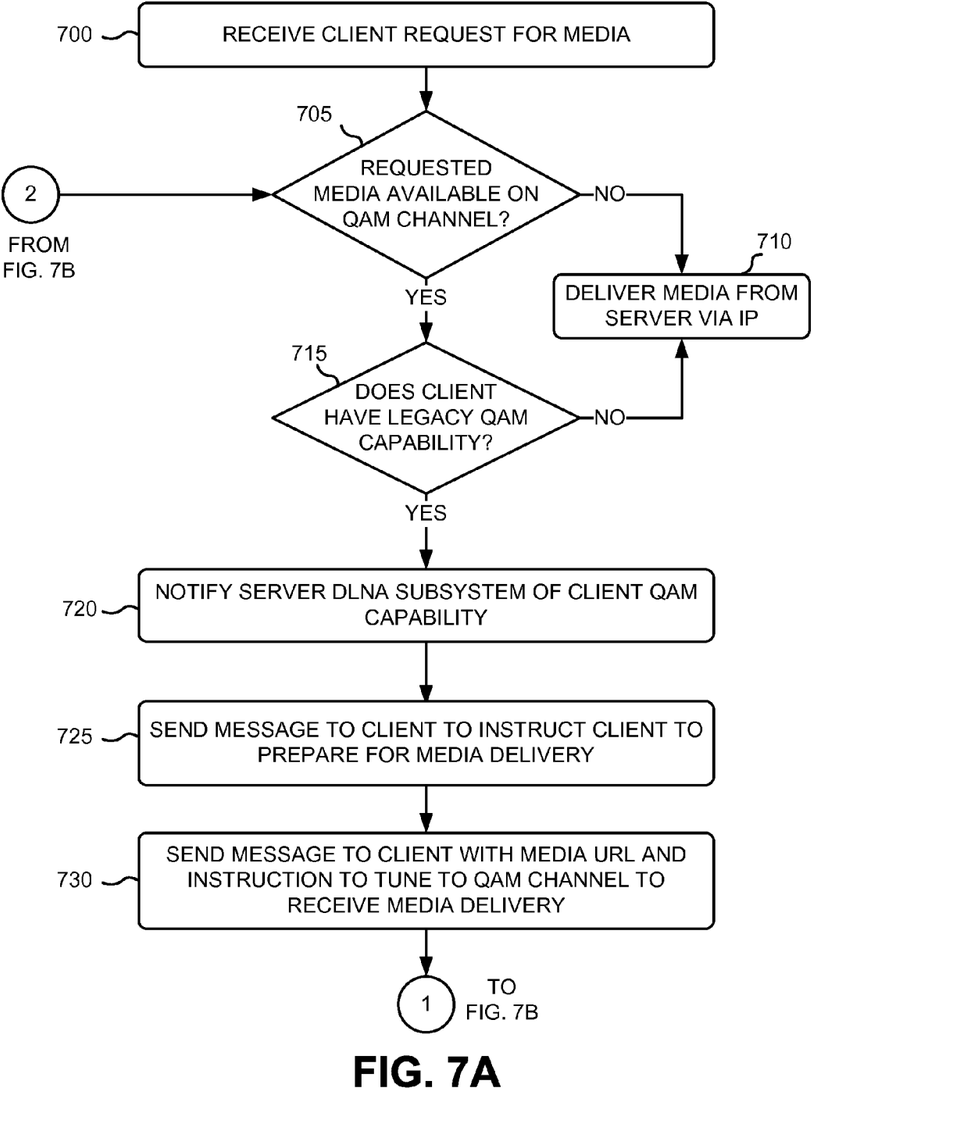
FIGS. 7A and 7B are flow diagrams illustrating an exemplary process for controlling the delivery of media to a client 125 at server 115.
Figure 7B:
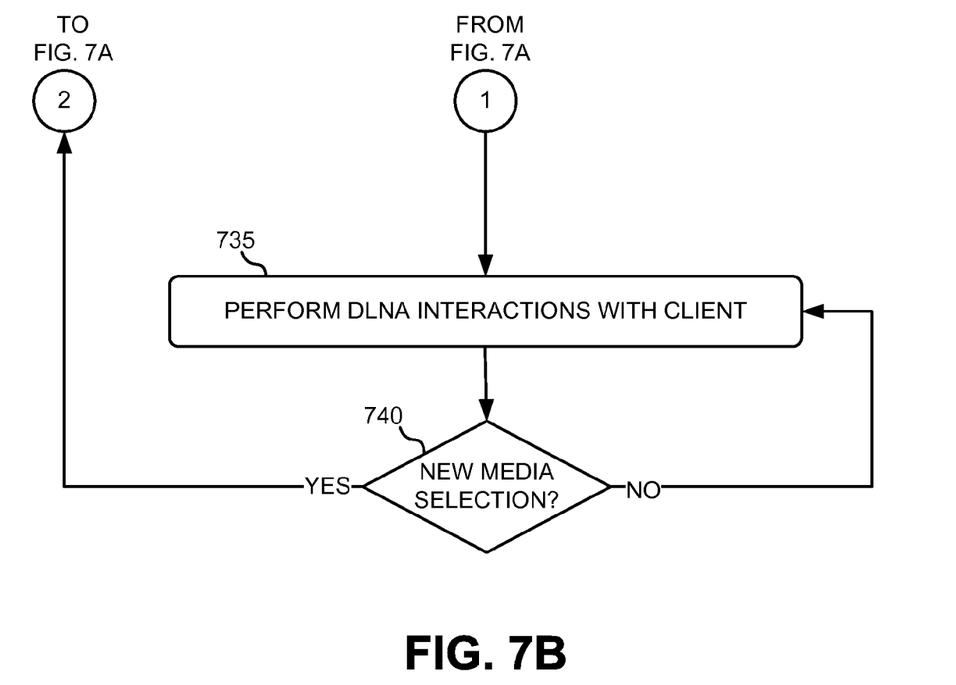

FIGS. 7A and 7B are flow diagrams illustrating an exemplary process for controlling the delivery of media to a client 125 at server 115. The exemplary process of FIGS. 7A & 7B may be implemented by various components of server 115, as described further below.

The exemplary process may include receiving a request for media from a client 125 (block 700). A user at a client 125 may initiate a request for specific media, and client 125 may send a corresponding message that identifies the requested media to server 115. Server 115 may determine whether the requested media is available on a QAM channel (block 705). Referring to FIG. 6, server 115 may determine whether there is a QAM channel, to which QAM tuner 400 may tune, that is available for delivering media from content service provider(s) to client 125. If the requested media is not available on a QAM channel (NO—block 705), then the requested media may be delivered from server 115 via IP (block 710). Once server 115 has determined that the requested media is not available on a QAM channel, server 115 may request the delivery of media from content service provider(s), and, as shown in FIG. 2A, content service provider(s) 105 may deliver 200 the media via a QAM channel to server 115 over network 110. Upon receipt of the media via the QAM channel, server 115 may process and deliver 205 the media to client 125 via IP.

If the requested media is available on a QAM channel (YES--block 705), then it may be determined if client 125 has legacy QAM capability (block 715). Server 115 may have previously identified whether client 125 has legacy QAM tuning capability (i.e., at the time client 125 was connected to receive media from server 115). If client 125 does not have legacy QAM capability (NO--block 715), then the exemplary process may continue at block 710 with the delivery of media from server 115 via IP. If client 125 does have legacy QAM capability (YES--block 715), then the server's DLNA subsystem 325 may be notified of client QAM capability (block 720). For example, processing unit 340 may notify DLNA subsystem 325 that client 125 has QAM capability.

Server 115 may send a message to client 125 to instruct client 125 to prepare for media delivery (block 725). DLNA subsystem 325, upon receipt of the QAM capability notification from processing unit 340, may construct and send a message, via IP subsystem 335, to instruct client 125 to prepare for media delivery. Server 115 may send a message to client 125 with the requested media's Uniform Resource Locator (URL) and an instruction to tune to a QAM channel to receive the media delivery (block 730). DLNA subsystem 325 may construct and send a message, via IP subsystem 335, which includes a URL that identifies the requested media and which further includes an instruction to tune to a QAM channel on network 110 on which content service provider(s) 105 may deliver the media. Server 115 may perform DLNA interactions with client 125 (block 735). The DLNA interactions may include any type of typical DLNA interaction, such as, for example, fast forwarding of the media, pausing of the media, etc.

Server 115 may determine whether there has been a new media selection at client 125 (block 740). The user at client 125 may initiate a request for different media, and client 125 may send a message including a request for the specific media to server 115. If no new media has been selected (NO—block 740), the exemplary process may return to block 735. If there has been a selection of new media at client 125, then the exemplary process may return to block 705 with a determination by server 115 of whether the requested media is available on a QAM channel.

Figure 8A:
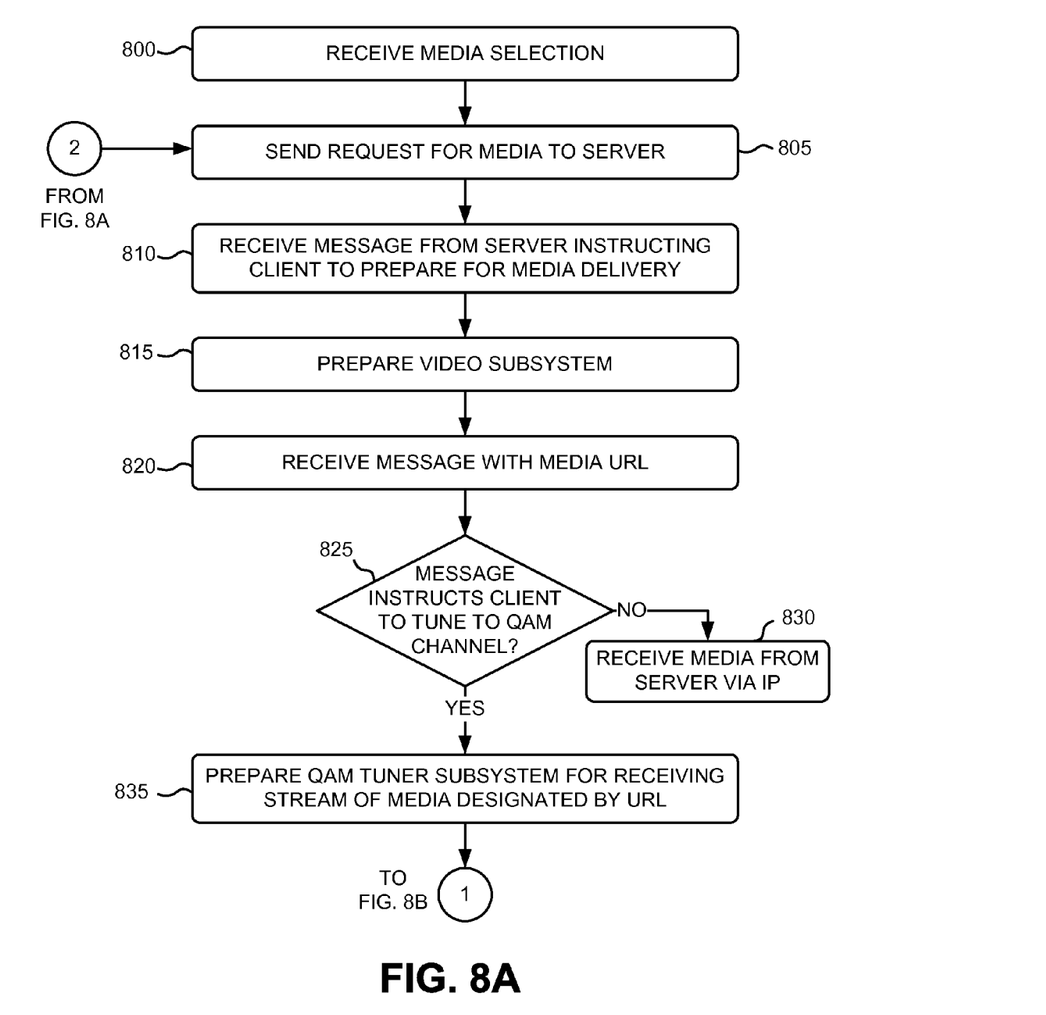
FIGS. 8A and 8B are flow diagrams illustrating an exemplary process for receiving a media stream at a client 125 using legacy QAM capability instead of receiving the media stream via IP delivery.
Figure 8B:
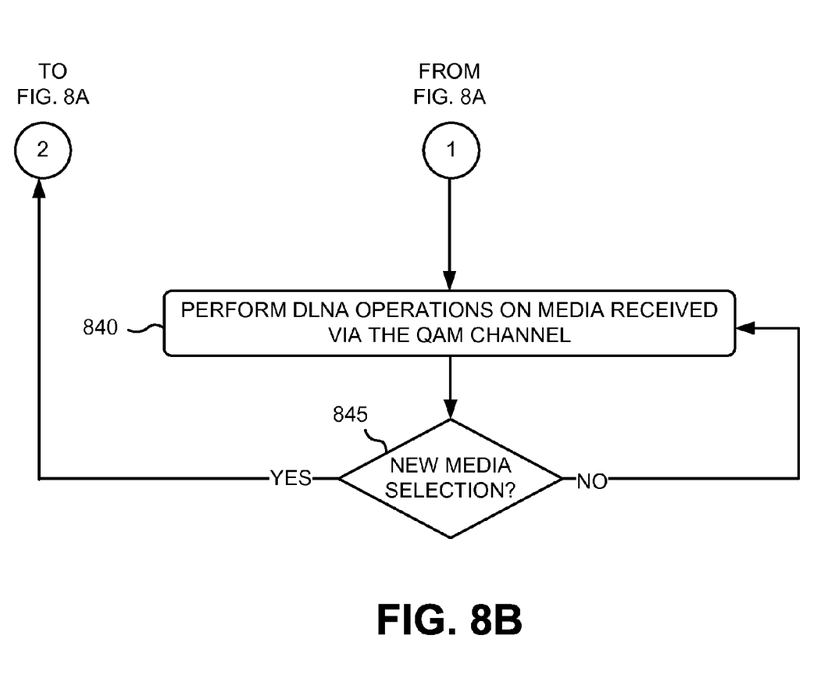

FIGS. 8A and 8B are flow diagrams illustrating an exemplary process for receiving media delivery at a client 125 using legacy QAM capability, instead of receiving the media delivery via IP delivery. The exemplary process of FIGS. 8A & 8B may be implemented by various components of client 125, as described further below.

The exemplary process may include receiving a selection of media (block 800). A user at client 125 may enter a selection of certain media. For example, the user may select a certain programming channel via a remote control, and client 125 may notify server 115 of the selected programming channel. A request for the selected media may be sent to server 115 (block 805). Client 125 may construct a message, including an identification of the selected media, and may send the message to server 115. Client 125 may receive a message from server 115 instructing client 125 to prepare for media delivery (block 810).

Client 125 may prepare video subsystem 410 for receipt of the delivered media (block 815). The preparation may include, for example, establishing a buffer for the delivered media data. Client 125 may receive a message with the selected media's Uniform Resource Locator (URL) (block 820). The media's URL may specifically identify the content (e.g., media). Client 125 may determine if the message received in block 820 instructs client 125 to tune to a QAM channel (block 825). The message may include an instruction parameter that instructs QAM tuner 400 of client 125 to tune to a specific QAM channel on network 110 to receive media delivered from content service provider(s) 105. If the message does not include the instruction to tune to the QAM channel, then the media may be received from server 115 over network 120 via IP (block 830).

If the message received in block 820 instructs client 125 to tune to a QAM channel (YES—block 825), then QAM tuner subsystem 400 may tune to the QAM channel to receive the stream of media designated by the URL (block 835). DLNA subsystem 420 of client 125 may perform DLNA operations on media received via the QAM channel (block 840). The DLNA operations may include, for example, fast forwarding or pausing the media, or other types of typical DLNA operations. Client 125 may determine whether there has been a new media selection (block 845). The user at client 125 may, for example, select different media using a remote control. If there is no new selection of media, then the exemplary process may return to block 840 with the continued performance of DLNA operations by DLNA subsystem 420. If there has been a new selection of media (YES—block 845), then the exemplary process may return to block 805 with the sending of a request for the selected media to server 115.

Figure 9:
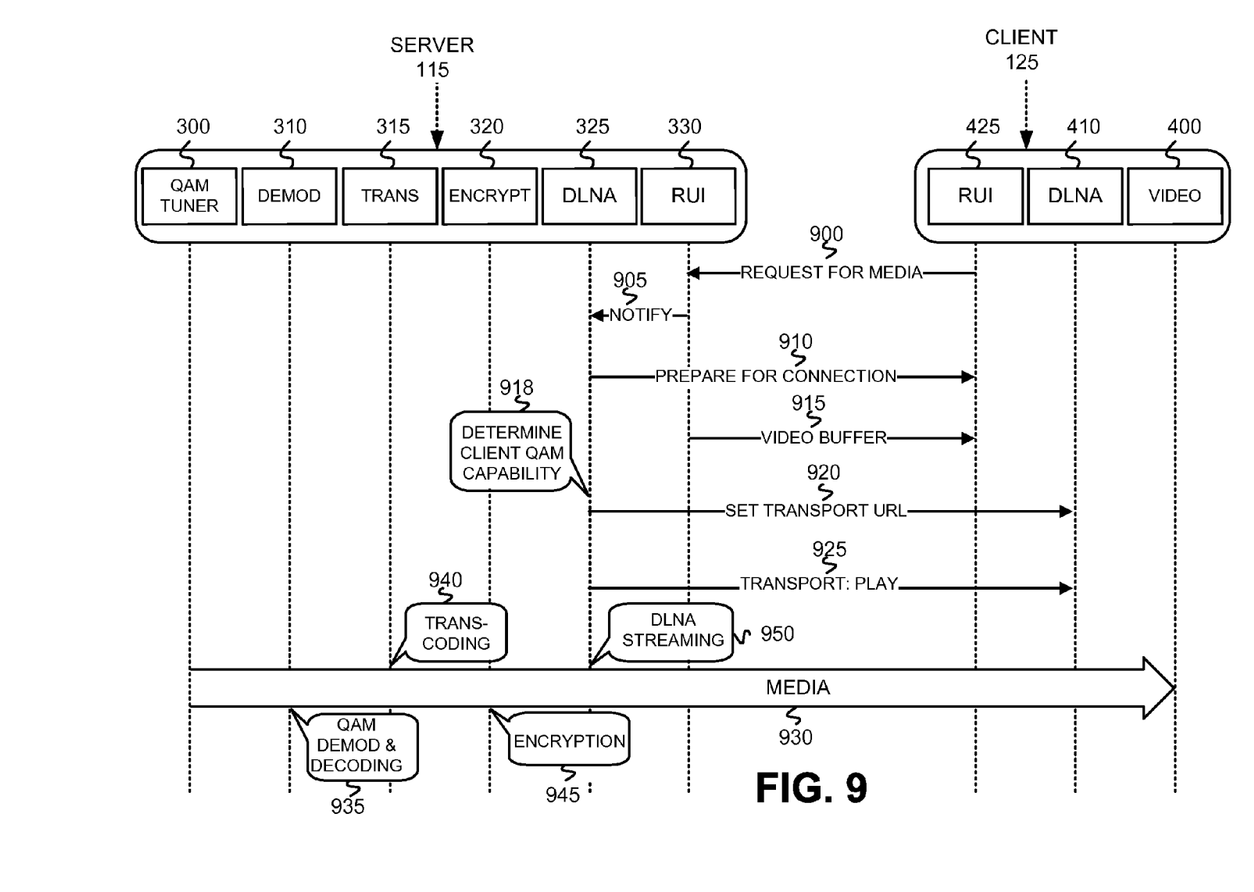
FIG. 9 is a diagram that depicts the delivery of media from the server to a client of FIG. 1 using IP.

FIG. 9 is a diagram that depicts the delivery of media from the server to a client of FIG. 1 using IP according to an exemplary embodiment. The delivery of media shown in the exemplary embodiment of FIG. 9 may occur if it is determined by server 115 that client 125 does not have legacy QAM tuning capability. As shown in FIG. 9, RUI 425 of client 125 may send a request for media 900 to RUI 330 of server 115. Upon receipt of request for media 900, RUI 330 may notify 905 DLNA subsystem 325 of the request, and DLNA subsystem 325 may send a connection preparation 910 message to RUI 425 of client 125. RUI 330 of server 115 may also send a video buffer message 915 to RUI 425 of client 125 such that a video buffer may set set-up for receiving the media from server 115.

DLNA subsystem 325 at server 115 may determine 918 the QAM capability of client 125. If client 125 does not have QAM tuning capability, then DLNA subsystem 325 of server 115 may send a message 920 that sets the transport URL that identifies the media to be delivered by server 115. DLNA 325 may then send a message 925 that indicates that the media will be transported for playback at client 125.

QAM tuner 300 of server 115 may tune to a QAM channel on network 110 to receive the media delivered from content service provider(s) 105. Upon receipt of the delivered media, demodulation subsystem 310 at server 115 may QAM demodulate and decode 935 the media 930, transcoder subsystem 315 may transcode 940 the media, encryption subsystem 320 may perform encryption 945 upon the media, and DLNA subsystem 325 may perform DLNA streaming 950 with media 930 to deliver the media to client 125.

Figure 10:
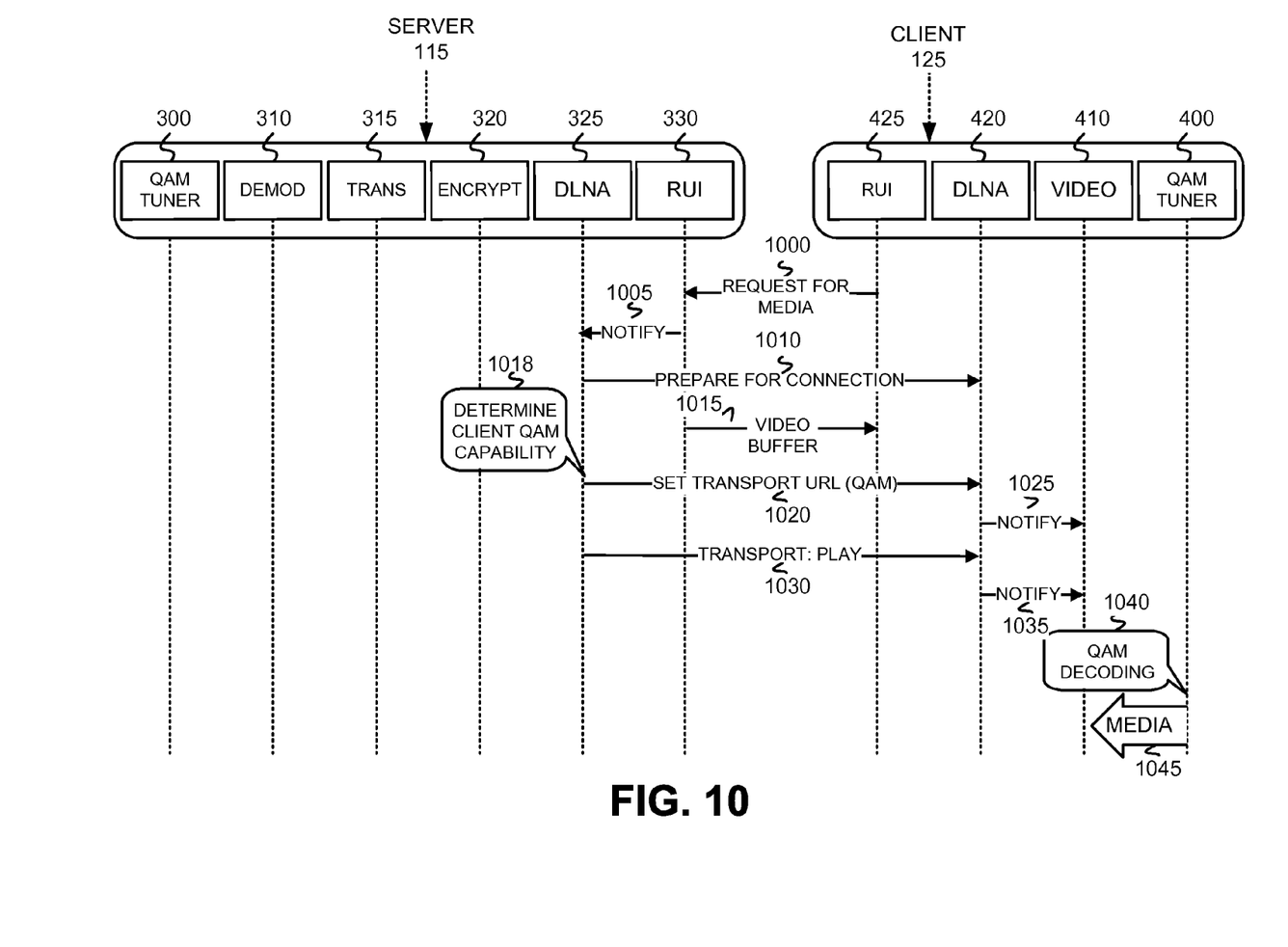
FIG. 10 is diagram that depicts the server of FIG. 1 instructing a client to tune to a QAM channel to receive a media stream instead of via IP.

FIG. 10 is a diagram that depicts the delivery of media, according to an exemplary embodiment, to a client 125 of FIG. 1 when it is determined by server 115 that client 125 has legacy QAM tuning capability.

As shown in FIG. 10, RUI 425 of client 125 may send a request for media 1000 to RUI 330 of server 115. Upon receipt of request for media 1000, RUI 330 may notify 1005 DLNA subsystem 325 of the request, and DLNA subsystem 325 may send a connection preparation 1010 message to RUI 425 of client 125. RUI 330 of server 115 may also send a video buffer message 1015 to RUI 425 of client 125 such that a video buffer may be set up for receiving the media stream from server 115.

DLNA subsystem 325 at server 115 may determine 1018 the QAM capability of client 125. If client 125 does not have QAM tuning capability, then DLNA subsystem 325 of server 115 may send a message 1020 that sets the transport URL that identifies the media to be delivered to client 125. Message 1020 may further include an instruction for QAM tuner 400 of client 125 to tune to a QAM channel. DLNA 420 of client 125 may notify 1025 video subsystem 410 of imminent media stream transport. DLNA subsystem 325 of server 115 may then send a message 1030 to DLNA 420 of client 125 that indicates that the media will be transported via a QAM channel for playback at client 125. DLNA 420 of client 125 may notify 1035 video subsystem 410 of media transport via the QAM channel.

QAM tuner 400 of client 125 may tune to a QAM channel on network 110 to receive the media delivered from content service provider(s) 105. Upon receipt of the delivered media, demodulation subsystem 405 (not shown in FIG. 10) at client 125 may QAM demodulate and decode the media 1045 and video subsystem 410 of client 125 may present the media for display to the user.

As described herein, exemplary embodiments use QAM tuning capabilities of legacy client devices in a remote user interface system (e.g., an RVU system) to reduce the demand on bandwidth and resources of the server that serves a subscriber's client devices. If a client device requesting the delivery of media is determined by the server to have QAM capabilities, then the server may instruct the client device to itself tune to a QAM channel to receive delivery of the media from the content service provider. If the client device requesting the delivery of media is determined by the server to not have QAM capabilities, then the server may tune to a QAM channel to receive delivery of the media from the content service provider, and may then process and deliver the media to the client device using IP.

The foregoing description of implementations provides illustration and description, but is not intended to be exhaustive or to limit the invention to the precise form disclosed. Modifications and variations are possible in light of the above teachings or may be acquired from practice of the invention. For example, while series of blocks have been described with regard to FIGS. 7A, 7B, 8A and 8B, the order of the blocks may be modified in other embodiments. Further, non-dependent blocks may be performed in parallel. Some embodiments have been described herein with respect to an RVU system. However, embodiments described herein are applicable to other types of remote user interface systems, with the RVU system representing only one specific example of such remote user interface systems.

Certain features described above may be implemented as "logic" or a "unit" that performs one or more functions. This logic or unit may include hardware, such as one or more processors, microprocessors, application specific integrated circuits, or field programmable gate arrays, software, or a combination of hardware and software.

No element, act, or instruction used in the description of the present application should be construed as critical or essential to the invention unless explicitly described as such. Also, as used herein, the article "a" is intended to include one or more items. Further, the phrase "based on" is intended to mean "based, at least in part, on" unless explicitly stated otherwise.

In the preceding specification, various preferred embodiments have been described with reference to the accompanying drawings. It will, however, be evident that various modifications and changes may be made thereto, and additional embodiments may be implemented, without departing from the broader scope of the invention as set forth in the claims that follow. The specification and drawings are accordingly to be regarded in an illustrative rather than restrictive sense.

What is claimed is:

1. A method, comprising:
  receiving, at a server device from a first single client device, a first request for delivery of media;
  receiving, at the server device from a second single client device, a second request for delivery of the media;
  determining, at the server device, that the requested media is available via a quadrature amplitude modulated (QAM) channel carried by a first network;
  determining, at the server device, that the first single client device has QAM tuning mechanisms, included as physical components within the first single client device, for tuning to the QAM channel;

sending a message from the server device to the first single client device to instruct the first single client device to tune to the QAM channel to receive the requested media from a content service provider via the first network and the QAM channel and not via the server device;

determining that the second single client device does not have QAM tuning mechanisms included as physical components within the second single client device; and sending the requested media, from the server device to the second single client device using Internet Protocol (IP).

2. The method of claim 1, wherein the server device comprises a remote user interface server entity.

3. The method of claim 2, wherein the remote user interface server entity comprises an RVU server entity that operates in compliance with the RVU protocol specification.

4. The method of claim 1, wherein the message includes a Uniform Resource Locator (URL) for identifying the requested media.

5. The method of claim 1,
wherein, responsive to determining that the second single client device does not have QAM tuning mechanisms included as physical components within the second single client device and the requested media is available via the QAM channel, the method further comprising:
tuning to the QAM channel carried by the first network, and
receiving the requested media via the QAM channel.

6. The method of claim 5, wherein sending the requested media, from the server device to the second single client device further comprises:
formatting the received media for sending via IP, and
sending the formatted media from the server device to the second single client device.

7. The method of claim 1, wherein the first network comprises a cable network, a satellite network, a telecommunications network, or an Advanced Television Systems Committee (ATSC) standards network.

8. A server device, comprising:
a remote user interface (RUI) configured to receive a first request from a first single client device and a second request from a second single client device, for delivery of media; and
one or more subsystems configured to:
determine that the requested media is available via a quadrature amplitude modulated (QAM) channel carried by a first network,
determine that the first single client device has QAM tuning mechanisms, included as physical components within the first single client device, for tuning to the QAM channel of the first network,
send a message to the first single client device to instruct the first single client device to tune to the QAM channel to receive the requested media from a content service provider via the first network and the QAM channel and not via the server device,
determine that the second single client device does not have QAM tuning mechanisms included as physical components within the second single client device, and
send the requested media from the server device to the second single client device via Internet Protocol (IP).

9. The server device of claim 8, wherein the server device comprises a remote user interface server device.

10. The server device of claim 9, wherein the server device comprises an RVU server device that operates in compliance with the RVU protocol specification.

11. The server device of claim 8, wherein the message includes a Uniform Resource Locator (URL) for identifying the requested media.

12. The server device of claim 8, wherein the one or more subsystems are further configured to,
responsive to determining that the second single client device does not have QAM tuning mechanisms included as physical components within the second single client device and the requested media is available via the QAM channel:
tune to the QAM channel carried by the first network, and
receive the requested media via the QAM channel.

13. The server device of claim 8, wherein, when sending the requested media from the server device to the second single client device via the IP network, the one or more subsystems are further configured to:
format the received media for sending via IP, and
send the formatted media from the server device to the second single client device.

14. The server device of claim 8, wherein the first network comprises a cable network, a satellite network, a telecommunications network, or an Advanced Television Systems Committee (ATSC) standards network.

15. A method, comprising:
receiving, at a server device from a first single client device, a first request for delivery of media;
receiving, at the server device from a second single client device, a second request for delivery of the media;
determining, at the server device, that the requested media is available via a quadrature amplitude modulated (QAM) channel carried by a first network;
determining, at the server device, that the first single client device has QAM tuning mechanisms, included as physical components within the first single client device, for tuning to the QAM channel carried by the first network;
sending a message from the server device to the first single client device to instruct the first single client device to tune to the QAM channel to receive the requested media directly from a content service provider via the first network and the QAM channel;
determining that the second single client device does not have QAM tuning mechanisms included as physical components within the second single client device;
tuning, at the server device, to the QAM channel to receive delivery of the requested media from the content service provider;
processing, by the server device, the requested media received via the QAM channel; and
sending the processed media from the server device to the second single client device using Internet Protocol (IP).

16. The method of claim 15, wherein the server device comprises a remote user interface server entity.

17. The method of claim 16, wherein the remote user interface server entity comprises an RVU server entity that operates in compliance with the RVU protocol specification.

18. The method of claim 15, wherein the message includes a Uniform Resource Locator (URL) for identifying the requested media.

19. The method of claim 15, wherein the first network comprises a cable network, a satellite network, a telecommunications network, or an Advanced Television Systems Committee (ATSC) standards network.

* * * * *